(12) United States Patent
Soliman et al.

(10) Patent No.: US 11,400,685 B2
(45) Date of Patent: Aug. 2, 2022

(54) GRADUALLY RECRUITED FIBER REINFORCED POLYMER (FRP) COMPOSITE

(71) Applicant: STC.UNM, Albuquerque, NM (US)

(72) Inventors: Eslam Mohamed Soliman, Albuquerque, NM (US); Mahmoud Reda Taha, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 9 days.

(21) Appl. No.: 16/954,164

(22) PCT Filed: Dec. 14, 2018

(86) PCT No.: PCT/US2018/065761
§ 371 (c)(1),
(2) Date: Jun. 15, 2020

(87) PCT Pub. No.: WO2019/118881
PCT Pub. Date: Jun. 20, 2019

(65) Prior Publication Data
US 2021/0154968 A1 May 27, 2021

Related U.S. Application Data

(60) Provisional application No. 62/599,654, filed on Dec. 15, 2017.

(51) Int. Cl.
*B32B 5/04* (2006.01)
*B32B 5/12* (2006.01)
(Continued)

(52) U.S. Cl.
CPC .............. *B32B 5/12* (2013.01); *B32B 5/26* (2013.01); *B32B 5/28* (2013.01); *B29C 64/10* (2017.08); *B29C 64/165* (2017.08); *B29C 70/16* (2013.01); *B29C 70/20* (2013.01); *B29K 2105/08* (2013.01); *B29K 2105/105* (2013.01); *B29L 2009/00* (2013.01); *B32B 5/02* (2013.01); *B32B 5/04* (2013.01); *B32B 5/08* (2013.01); *B32B 5/14* (2013.01); *B32B 2250/05* (2013.01); *B32B 2250/20* (2013.01); *B32B 2250/40* (2013.01);
(Continued)

(58) Field of Classification Search
CPC .............................................. Y10T 428/24993
See application file for complete search history.

(56) References Cited

U.S. PATENT DOCUMENTS 5,419,200 A * 5/1995 Burns ..................... G01B 5/30
73/810
5,936,861 A * 8/1999 Jang ....................... B33Y 30/00
700/98
(Continued)

FOREIGN PATENT DOCUMENTS

CN 103336871 A * 10/2013
CN 105404732 A * 3/2016 ............. G06F 30/15
(Continued)

*Primary Examiner* — Jeffrey A Vonch
(74) *Attorney, Agent, or Firm* — Keith Vogt, Ltd.; Keith A. Vogt

(57) ABSTRACT

A 3D printed fiber reinforced polymer composite having a nonlinear stress-strain profile created by a central layer and a plurality of recruited successive layers.

12 Claims, 8 Drawing Sheets

(51) Int. Cl.

| | | |
|---|---|---|
| *B32B 5/26* | (2006.01) | |
| *B32B 5/28* | (2006.01) | |
| *B33Y 80/00* | (2015.01) | |
| *B29C 64/165* | (2017.01) | |
| *B29C 70/20* | (2006.01) | |
| *B32B 5/08* | (2006.01) | |
| *B32B 5/14* | (2006.01) | |
| *B32B 5/02* | (2006.01) | |
| *B29C 64/10* | (2017.01) | |
| *B29K 105/10* | (2006.01) | |
| *B29C 70/16* | (2006.01) | |
| *B29L 9/00* | (2006.01) | |
| *B29K 105/08* | (2006.01) | |

(52) U.S. Cl.
CPC ..... *B32B 2260/023* (2013.01); *B32B 2262/14* (2013.01); *B32B 2305/07* (2013.01); *B32B 2305/10* (2013.01); *B32B 2307/50* (2013.01); *B32B 2307/54* (2013.01); *B32B 2307/546* (2013.01); *B32B 2398/00* (2013.01); *B32B 2419/00* (2013.01); *B33Y 80/00* (2014.12); *Y10T 428/24124* (2015.01); *Y10T 428/24132* (2015.01); *Y10T 428/24942* (2015.01); *Y10T 428/249942* (2015.04); *Y10T 428/249943* (2015.04); *Y10T 428/249945* (2015.04); *Y10T 428/249946* (2015.04); *Y10T 428/249947* (2015.04)

(56) References Cited

U.S. PATENT DOCUMENTS

| | | | | |
|---|---|---|---|---|
| 6,048,426 | A * | 4/2000 | Pratt | B32B 5/26 156/324 |
| 6,524,692 | B1 * | 2/2003 | Rosen | B32B 5/26 248/608 |
| 8,645,110 | B1 * | 2/2014 | Weckner | G06F 30/15 703/2 |
| 9,833,986 | B1 * | 12/2017 | Susnjara | B29C 64/106 |
| 10,239,257 | B1 * | 3/2019 | Mantha | B29C 70/38 |
| 2002/0028332 | A1 * | 3/2002 | Pratt | A63B 59/50 428/364 |
| 2004/0048022 | A1 * | 3/2004 | Pratt | F16F 1/366 428/36.91 |
| 2006/0029807 | A1 * | 2/2006 | Peck | B32B 37/00 428/411.1 |
| 2010/0299112 | A1 * | 11/2010 | Goldberg | G06F 30/23 703/2 |
| 2011/0015905 | A1 * | 1/2011 | Gull | G06F 30/15 703/2 |
| 2013/0337256 | A1 * | 12/2013 | Farmer | B29C 70/04 428/371 |
| 2014/0151507 | A1 * | 6/2014 | Woodard | B32B 5/12 428/113 |
| 2014/0287139 | A1 * | 9/2014 | Farmer | B29C 64/106 118/695 |
| 2014/0288893 | A1 * | 9/2014 | Blom | G06F 30/00 703/1 |
| 2015/0165691 | A1 * | 6/2015 | Mark | B29C 64/393 700/98 |
| 2016/0107379 | A1 * | 4/2016 | Mark | G06F 30/00 700/98 |
| 2016/0114532 | A1 * | 4/2016 | Schirtzinger | B29C 64/147 428/411.1 |
| 2016/0224698 | A1 * | 8/2016 | Rassaian | G06F 30/20 |
| 2016/0311165 | A1 * | 10/2016 | Mark | B29C 64/386 |
| 2017/0008250 | A1 * | 1/2017 | Kashiwagi | B32B 5/142 |
| 2017/0120519 | A1 * | 5/2017 | Mark | B29C 64/386 |
| 2017/0157851 | A1 * | 6/2017 | Nardiello | B29C 48/304 |
| 2017/0173868 | A1 * | 6/2017 | Mark | G06F 30/00 |
| 2017/0274585 | A1 * | 9/2017 | Armijo | B29C 64/268 |
| 2017/0314269 | A1 * | 11/2017 | Taha | E04C 5/073 |
| 2018/0043638 | A1 * | 2/2018 | Temple | B29C 70/54 |
| 2018/0186058 | A1 * | 7/2018 | Büsgen | B29C 64/106 |
| 2018/0321659 | A1 * | 11/2018 | Dasappa | B29C 64/118 |

FOREIGN PATENT DOCUMENTS

| | | | | |
|---|---|---|---|---|
| WO | WO-9308023 | A1 * | 4/1993 | ............... B32B 3/18 |
| WO | WO-2016081849 | A1 * | 5/2016 | ............... E04C 5/07 |

* cited by examiner

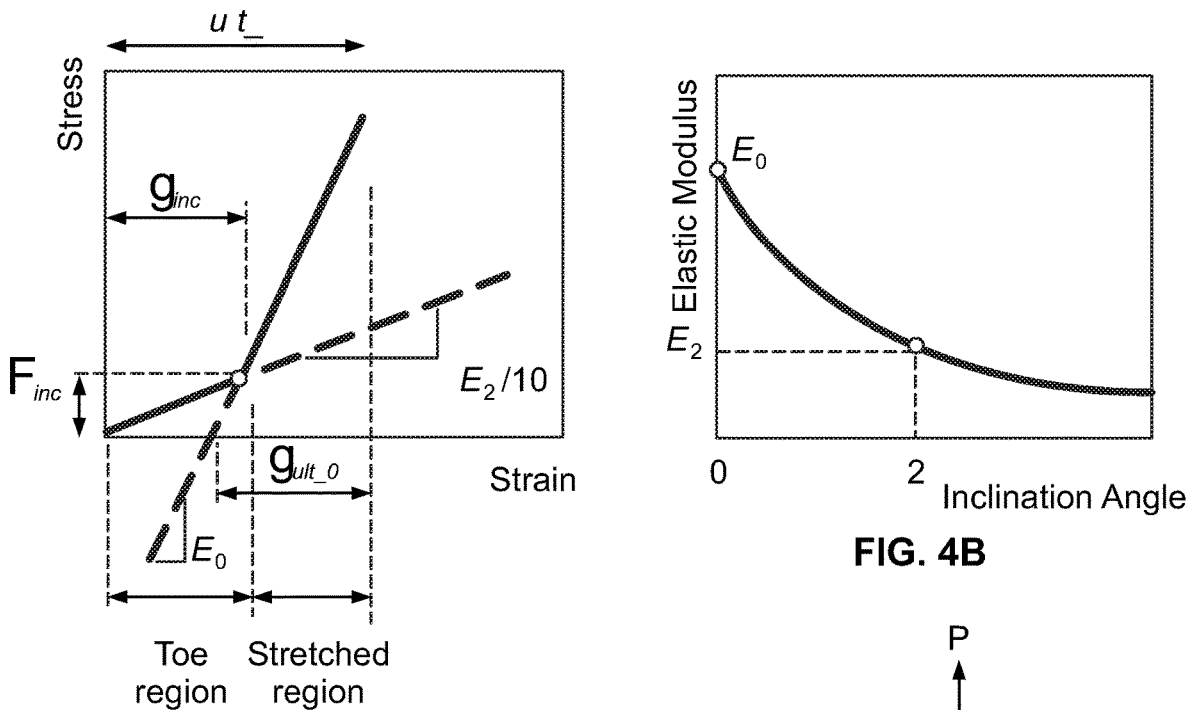
FIG. 4A
FIG. 4B
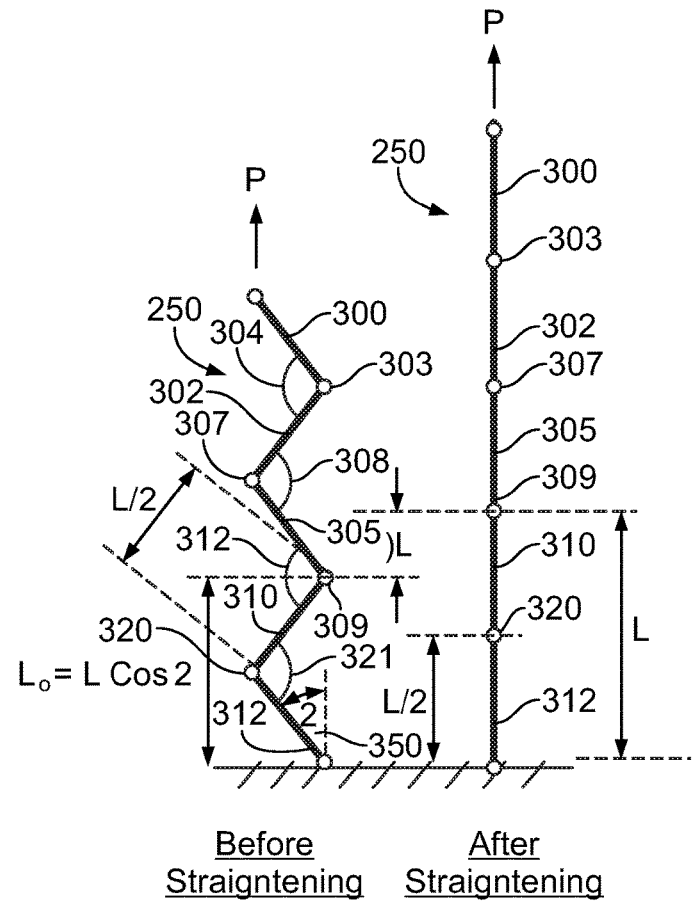
FIG. 4C

Assume ratio of A1:A2:A3 = 1:2:3

Assume $E_{lamina} = E$ $E1 = E$ $E2 = E + 2E = 3E$ $E3 = 3E + 3E = 6E$ $E4 = 6E - E = 5E$ $E5 = 5E - 2E = 3E$

GRADUALLY RECRUITED FIBER REINFORCED POLYMER (FRP) COMPOSITE

RELATED APPLICATIONS

This application claims priority to U.S. Provisional Application No. 62/599,654 filed 15 Dec. 2017 which is incorporated herein in its entirety.

BACKGROUND OF THE INVENTION

There has been considerable interest in designing new structures and strengthening existing structures using fiber reinforced polymers (FRP). Two basic types of FRP exist: carbon (CFRP) and glass (GFRP). Other types using Kevlar, aramid, and basalt fibers are less popular may also be used with embodiments of the present invention. FRP materials exist in two forms (unidirectional or bi-directional).

FRP materials provide linear elastic responses under tension loads. In infrastructure applications, nonlinear behavior is important as it allows ductile (non-sudden) failure of structures which is required by most design codes worldwide. The absence of ductility (sudden and brittle failure) at low strains at failure has hindered the widespread use of FRP in civil infrastructure.

Hybrid FRP systems have been developed and have shown the ability to provide nonlinear behavior. However, these systems require a combination of multiple types of fibers (not mono-type) during fabrication which make hybrids expensive, cumbersome and unattractive for field applications. Failure strain of hybrid fibers has been limited to 3% which does not truly represent ductile behavior.

Moreover, reinforced and pre-stressed concrete infrastructures built in the 1960s and 1970s and are now observing severe deterioration due to corrosion of conventional steel reinforcement. Corrosion of steel typically results from the exposure to aggressive environments (e.g., freeze and thaw cycles) and the use of de-icing salt. Several techniques such as epoxy coated steel bars have been developed to combat corrosion. While these techniques have been able to reduce the rate of corrosion, they have not been able to eliminate the corrosion problem.

There has been considerable interest in designing new concrete structures and strengthening existing concrete structures using FRP. FRP composites offer high strength and low weight, non-corrosiveness, and flexibility in design. Therefore, they represent ideal alternatives to conventional steel reinforcement. Two basic types of FRP exist in structural concrete applications: carbon (CFRP) and glass (GFRP). FRP composites can also be manufactured in different forms such as unidirectional or bi-directional materials. However, the absence of ductility associated with the use of FRP composites has hindered the widespread adoption of FRP composites in civil infrastructure. The absence of ductility is attributed to the linear elastic response of the FRP composite under tension loads. In infrastructure applications, nonlinear behavior of structural components is very important to avoid brittle (catastrophic) failure of structures which is required by most design codes worldwide.

BRIEF SUMMARY OF THE INVENTION

In one embodiment, the present invention provides FRPs that are adapted to be gradually recruited fiber reinforced polymer composites with superior ductility by creating a composite that has a non-linear response to a load.

In yet other embodiments, the present invention provides composites having a plurality of layers where a predetermined failure strain results in the recruitment of successive layers in the composite until all layers of the composite carry the load successively.

In another embodiment, the present invention provides a fiber reinforced polymer composite comprised of a plurality of layers containing a plurality of fibers. The plurality of layers are gradually recruited to resist a load to achieve a desired ductility.

In another embodiment, the present invention provides a fiber reinforced polymer composite comprised of a plurality of layers where a predetermined failure strain results in the recruitment of successive layers in the composite until all layers of composites carry the load successively.

In another embodiment, the present invention provides a fiber reinforced polymer composite comprised of a plurality of layers containing a plurality of fibers. The plurality of layers are gradually recruited to resist a load to enhance ductility. The layers have a shared stiffness that can be achieved by altering the area ratio of layers 1, 2, . . . and n such that failure in one layer does not result in catastrophic failure.

In another embodiment, the present invention provides a fiber reinforced polymer composite comprised of a plurality of layers containing a plurality of fibers. The layers provide an increase in ductility and failure strain which may be controlled by changing areal/stiffness ratios as well as the inclination angles of the fibers.

In another embodiment, the present invention provides a fiber reinforced polymer composite comprised of a plurality of layers containing a plurality of fibers. The layers having multiple loading peaks to provide superior ductility along with a structural warning prior to complete failure.

In another embodiment, the present invention provides a fiber reinforced polymer composite comprised of layers wherein the nonlinearity of the composite can be controlled by controlling the drop in load capacity by maintaining a sufficient number of active (stretched) layers throughout the loading history.

In another embodiment, the present invention provides a fiber reinforced polymer composite comprised of layers having fiber angles $\theta_1, \theta_2, \ldots$ and $\theta_n$, that are chosen such that the activation strain $\varepsilon_{inc}$, (strain to straighten inclined fibers) is in $\alpha$% increments of the failure strain.

In another embodiment, the present invention provides a fiber reinforced polymer composite comprised of layers wherein incorporating layers at different levels of activation strains ($\varepsilon_{inc}$) enables the composite materials to be gradually recruited as further strain is applied to the composite.

In another embodiment, the present invention provides a fiber reinforced polymer composite comprised of layers wherein multiple loading peaks in the stress-strain profile achieve superior ductility and provide sufficient structural warnings prior to complete failure.

In another embodiment, the present invention provides a fiber reinforced polymer composite comprised of layers and method of making the same including the steps of selecting the appropriate number of layers (n), the appropriate inclination angle (q) achieves specific activation strains ($\varepsilon_{inc}$) to produce a desired non-linear stress-strain profile using 3D printing technology.

In another embodiment, the present invention provides a fiber reinforced polymer composite comprised of layers wherein incrementing the activation strains in narrow intervals at any point during the loading history produces an appropriate number of active layers to provide adequate load bearing.

In another embodiment, the present invention provides a fiber reinforced polymer composite comprised of layers wherein the ductility of the FRP composite is achieved through engineering the strain capacity, multiple loading peaks, and nonlinear stress-strain profile.

In another embodiment, 3D printing (or additive manufacturing) methods may be used to manufacture the gradually recruited FRP composites. In the 3D printing process, layer-by-layer manufacturing techniques can be used to produce the multi-layer gradually recruited composites.

In another embodiment, the 3D printing can be used to print composite filaments with a pre-designed high precision fiber path for each layer. The composite filament consists of fiber and polymer matrix.

In another embodiment, the 3D printing can be used to control and engineer the properties of polymer matrix through thickness, along the loading direction, and across the transfer direction to enable adequate stress transfer between layers.

In another embodiment, engineering the polymer properties may be executed by controlling the polymer cross-linking and/or polymer crystallinity during the 3D printing process.

In another embodiment, controlling the polymer properties throughout the composite will enable engineering successive and gradual stress-transfer between layers.

In another embodiment, controlling the polymer properties will also enable successive gradual debonding between layers and will ensure continuous carrying of applied loads throughout the loading history.

In another embodiment, delayed successive activation for different layers through recruitment enables successive carrying of applied loads.

In another embodiment, 3D printing may involve using a single type, natural, synthetic, new or recycled fibers or multiple types (hybrid fibers) during the printing process.

In another embodiment, 3D printing of may involve using a single type of polymers or multiple types (hybrid polymers) during the printing process.

In another embodiment, 3D printing of may involve using a single type of polymers or multiple types (hybrid polymers) during the printing process.

In another embodiment, continuous or discontinuous (discrete) fibers may be used during the 3D printing to produce the desired fiber path.

In another embodiment, 3D printing may be used to control fiber volume fraction and its distribution throughout the composite.

In another embodiment, 3D printing may be used to control fiber volume fraction and its distribution throughout the composite.

In another embodiment, 3D printing for fibers, matrix, and controlled volume fractions will be used to engineer the stiffness ratio and regulate the successive activation and debonding process of different layers within the composites.

In another embodiment, nanomaterials will be incorporated to help engineer the desired polymer properties for achieving desired stress transfer between layers and controlled successive debonding of all layers. Nanomaterials may also be used to engineer the fiber-polymer interface to control the stress transfer at failure.

In another embodiment, intrinsic or extrinsic self-healing agents in the form of capsules, vascular networks and other forms can be incorporated in the polymer matrix to enable strength recovery after damage taking place in the composite.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIGS. 4A, 4B and 4C depict how incorporating layers at different levels of activation strains ($\varepsilon_{inc}$) enables the composite materials to be gradually recruited as strain is applied to the composite for an embodiment of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1C:
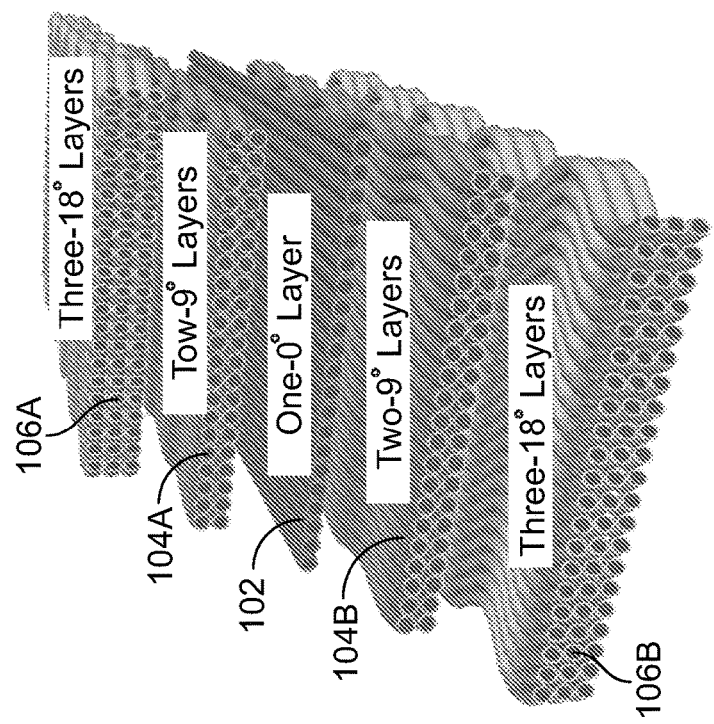
FIGS. 1A, 1B and 1C show how a layer-by-layer manufacturing technique can be used to produce the multi-layer gradually recruited composites for an embodiment of the present invention.
Figure 1A:
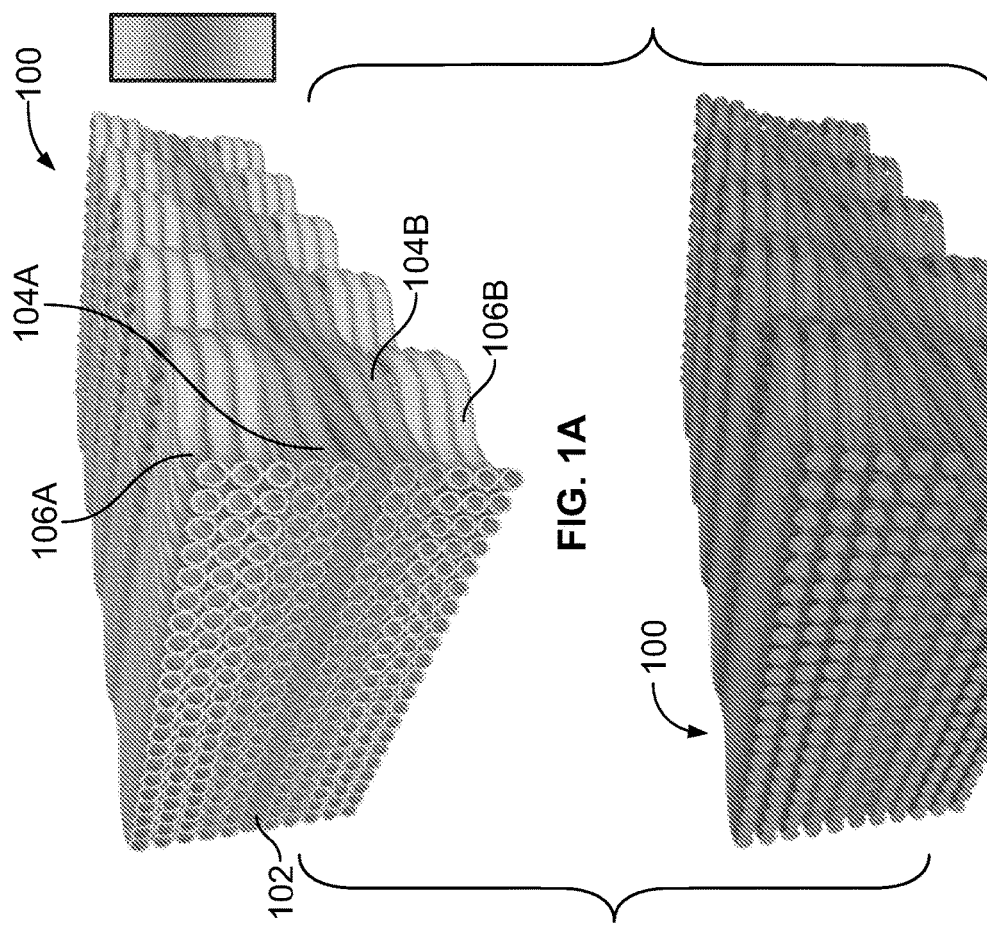
Figure 1B:
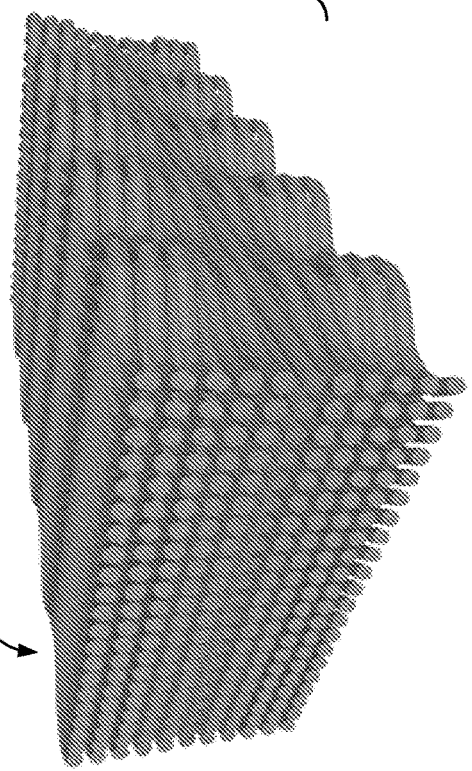
Figure 2:
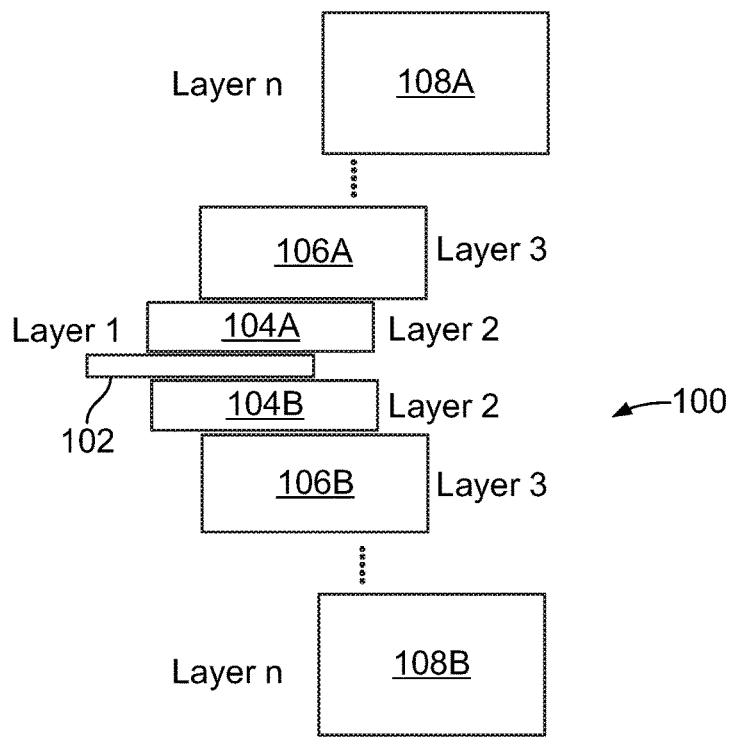
FIG. 2 is a schematic of an embodiment of the present invention.

FIGS. 1A-1C through FIG. 2 show how a layer-by-layer manufacturing technique, such as 3D-printing, can be used to produce the multi-layer gradually recruited composites of the present invention. As shown in FIG. 2, the present invention in one embodiment provides a composite 100 comprised of a plurality of layers 102, 104A-104B, 106A-

106A, 108A-108B and up to nth layers as desired. As is also shown, the layers have a plurality of fibers having inclination angles $\theta_1, \theta_2, \ldots$ and $\theta_n$, that are chosen such that the activation strain $\varepsilon_{inc}$ (strain to straighten inclined fibers) is in $\alpha$% increments (assumed here a=20%) that of failure strain. FIGS. 3A-3D show how the angle of the fibers in a layer changes, usually by increasing, with each layer.

In another embodiment, 3D printing (or additive manufacturing) methods may be used to manufacture the gradually recruited FRP composites. In 3D printing process, layer-by-layer manufacturing techniques can be used to produce the multi-layer gradually recruited composites as shown in FIGS. 1A-1C. In another embodiment, the 3D printing can be used to print composite filaments with a pre-designed high precision fiber path for each layer. The composite filament consists of fiber and polymer matrix. In another embodiment, the 3D printing can be used to control and engineer the properties of polymer matrix through thickness, along the loading direction, and across the transfer direction to enable adequate stress transfer between layers.

Figure 3A:
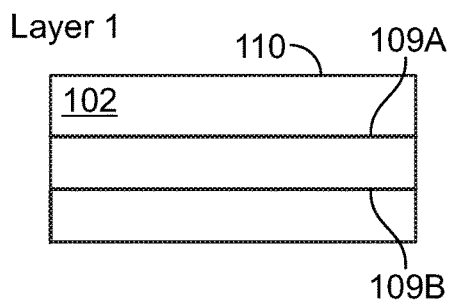
FIGS. 3A, 3B, 3C and 3D show how the angle of the fibers in a layer changes with each layer for an embodiment of the present invention.
Figure 3B:
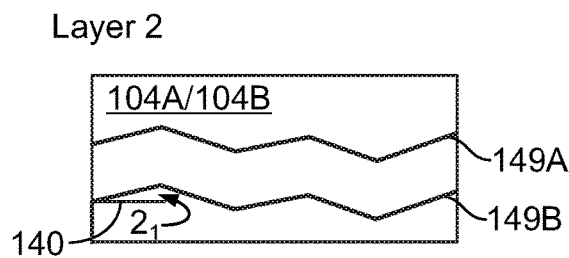
Figure 3C:
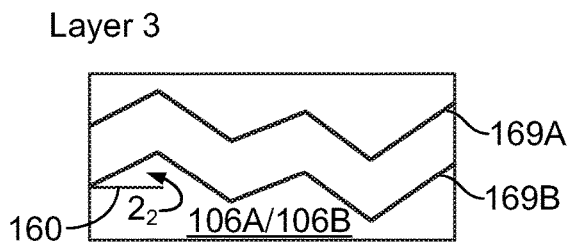
Figure 3D:
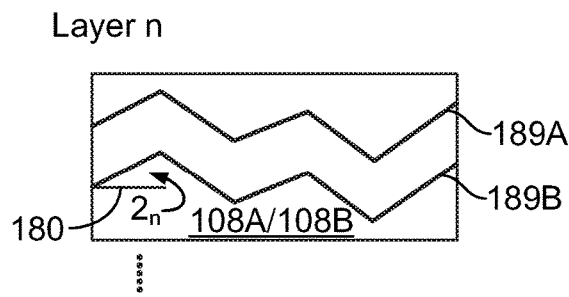

As further shown in FIGS. 2 and 3A, layer 102 has fibers 109A and 109B that have an inclination angle of zero degrees with respect to the straightening direction. As shown in FIGS. 2 and 3B, layers 104A and 104B form a pair of layers having fibers 149A and 149B that have an inclination angle of $\theta_1$ degrees with respect to the straightening direction 140. As shown in FIGS. 2 and 3C, layers 106A and 106B for a layer pair having fibers 169A and 169B that have an inclination angle of $\theta_2$ degrees with respect to the straightening direction 160. As shown in FIGS. 2 and 3D, layers 108A and 108B form a layer pair having fibers 189A and 189B that have an inclination angle of $\theta_3$ degrees with respect to the straightening direction 180. This arrangement may continue up to nth layers forming an nth layer pair having an inclination angle of $\theta_n$ degrees with respect to the straightening direction.

As is also shown in FIGS. 1A-1C through FIG. 3, in a preferred embodiment, the composite is constructed with a first layer 102 which may have straight fibers. Located on both sides of layer 102 are opposingly located first layer pairs 104A and 104B, which may use the same inclination angle in the fibers. The next layers are opposingly located second layer pairs 106A and 106B, which are located on both sides of layer layers 104A and 104B. Layers 106A and 106B may use the same inclination angle in the fibers. The pattern repeats until reaching the nth layer pairs which, as shown, are opposingly located to the preceding layers which, for this example, are layers 108A and 108B in FIG. 2. The nth layers may use the same inclination angle in the fibers. As shown, with respect to the central layer, the successive layer pairs form a composite of success layer pairs that are mirror images of one another with respect to the central layer.

Incorporating layers at different levels of activation strains ($\varepsilon_{inc}$) enables the composite materials to be gradually recruited as a strain is applied to the composite as shown in FIGS. 4A-4C. In FIG. 4C, the left-hand side shows a representative fiber 250 that may be used in the layers described herein. As shown, fiber 250 is kinked or forms a zigzag pattern. Mainly, fiber 250 is comprised of interconnected segments 300, 302, 305, 310, 312, etc. Each interconnected segment may be of the same length and connected to form an apex having a predetermined angle. For example segments 300 and 302 are angled with respect to each other at apex or connection point 303. The segments are angled to form a predetermined apex angle 304. Similarly, segments 302 and 305 repeat the pattern by connecting at apex or connection point 307 at a predetermined apex angle 308. As shown, apexes 303 and 307 are opposingly located to create the kinked or zigzagged pattern. This pattern of interconnected segments continues along fiber 250 for as long as desired. However, for illustrative purposes, FIG. 4C further shows additional segments 305, 310, 312, with opposingly located apexes 309 and 320 forming angles 312 and 321 respectively. As is also shown, when in the zigzagged pattern, the interconnected segments of fiber 250 are in a first position where the predetermined apex angles are at their lowest value. Then, as a strain or a pulling action is applied that causes fiber 250 to straighten, the interconnected segments transition from a kinked or zigzagged pattern to a second fiber pattern wherein the apex angle increases until an angle of 180 degrees is reached resulting in a straightened fiber as shown on the right-hand side of FIG. 4C. Alternately, as shown on the left-hand side of FIG. 4C, fiber 250 has a predetermined inclination angle 350 prior to straightening, and the right-hand side shows the straightened fibers with an inclination angle of zero.

In one embodiment, when the strain is 40% of the failure strain of layers one and two, the third layer activates. The plurality of layers of the composite then work together until the first layer starts to fail. The ratio of strain $\alpha$% achieved by each layer can be computed and will be governed by fabrication limits. Thus, as one or more layers fail, others are activated.

The shared stiffness may also be achieved by altering the area ratio of layers 1, 2, . . . and n such that failure in one layer does not result in catastrophic failure. A real optimal ratio (A1:A2:A3) may be determined using composite theory and the concept of shared stiffness.

Figure 5:
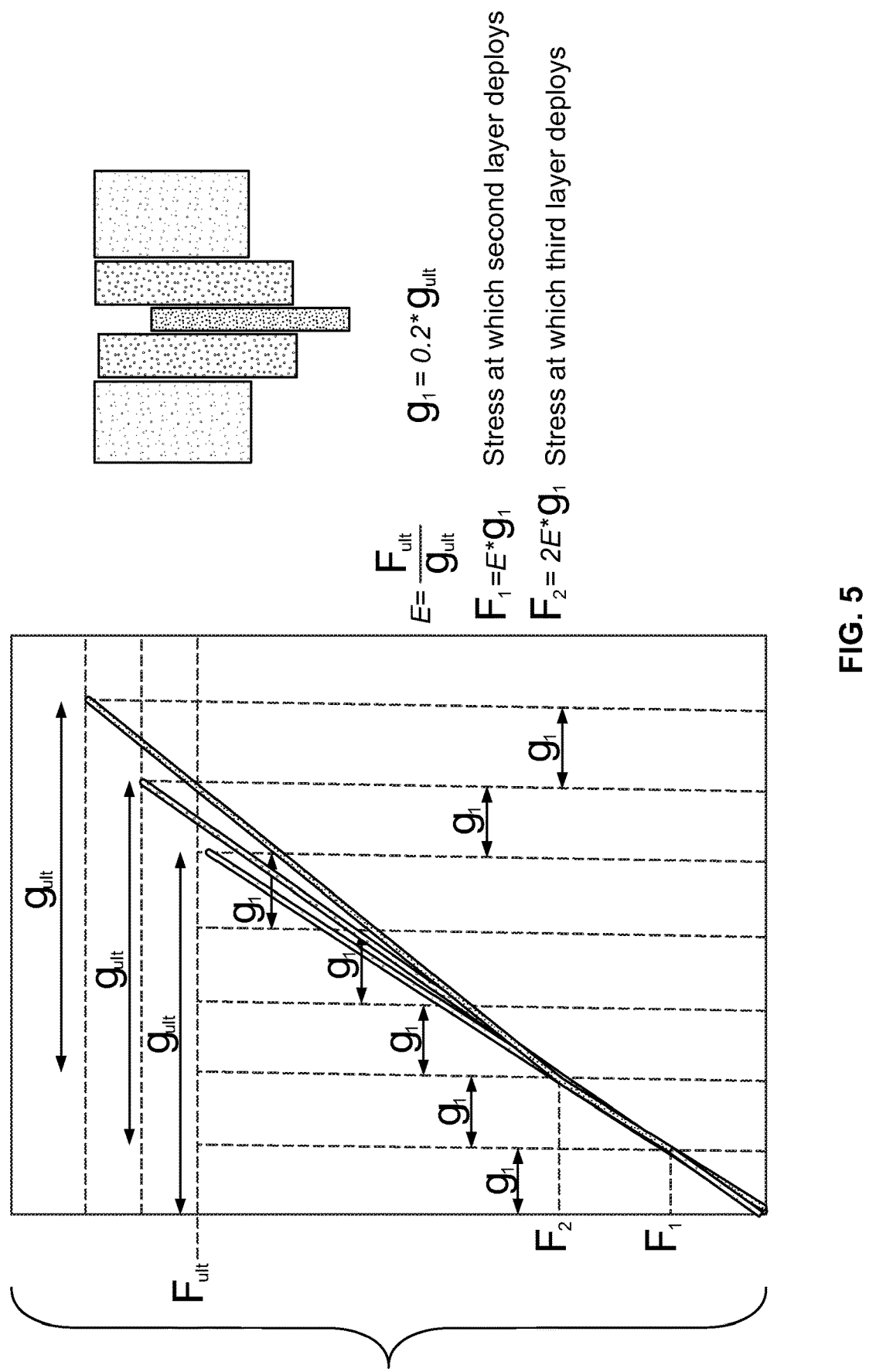
FIG. 5 illustrates the activation of different layers in a composite for an embodiment of the present invention.

In other embodiments, angle $\theta_1$ and $\theta_2$ are chosen such that $\varepsilon_{inc}$ is 20% that of failure strain. When 40% of the failure strain takes place, the third layer activates as shown in FIG. 5.

$$E = \frac{\sigma_{ult}}{\varepsilon_{ult}}$$

$$\varepsilon_1 = 0.2 * \varepsilon_{ult}$$

$\sigma_1 = E * \varepsilon_1$ Stress at which second layer deploys $\sigma_2 = 2E * \varepsilon_1$ Stress at which third layer deploys Controlling the stiffness of the outer layers to be less than the inner layers guarantees no complete failure when the first layer fails. Assume ratio of A1:A2:A3=1:2:3

Assume $E_{lamina}$=E

E1=E

E2=E+2E=3E

E3=3E+3E=6E

E4=6E−E=5E

E5=5E−2E=3E

Figure 6:
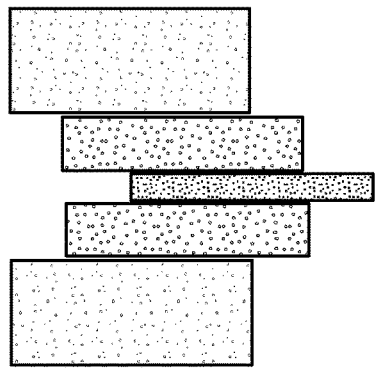
FIG. 6 illustrates how different ductility and strength can be achieved based on the ratio of the layers for an embodiment of the present invention.
Figure 6:
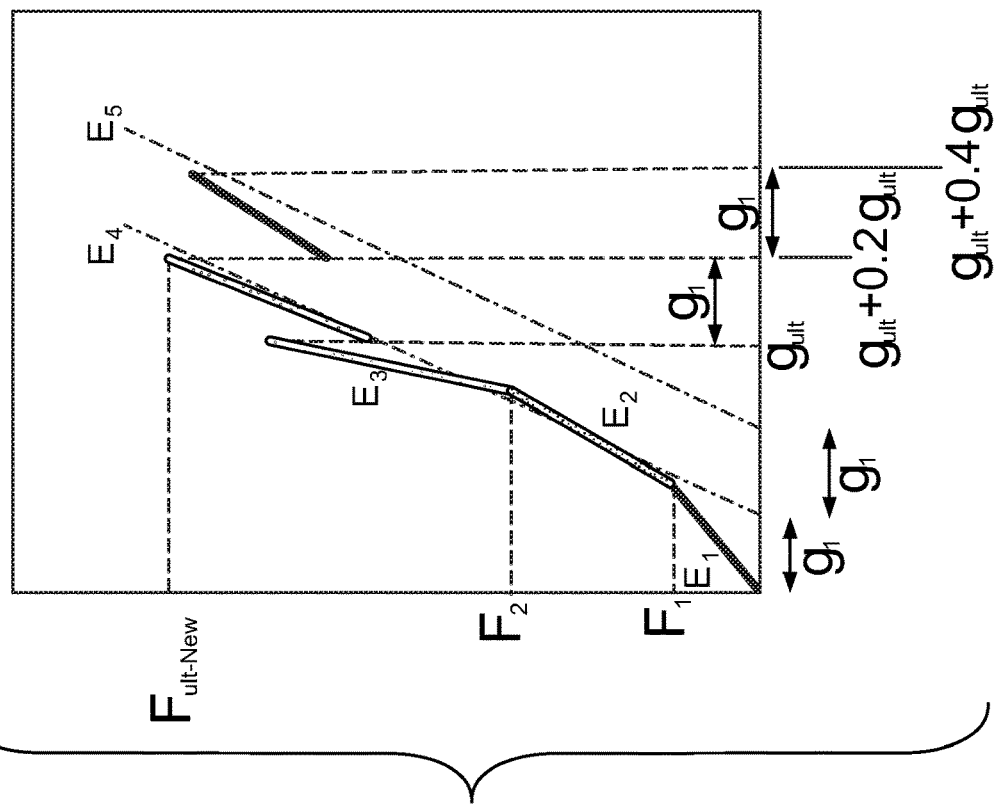

The proposed design, in which the stiffness of each successive layer decreases, increases the strain/ductility of the composite. Based on the ratio of the layers, different ductility and strength can be achieved as shown in FIG. 6. If the layers were straight, the strength would be 6E*εult. By implementing the above-described embodiments, the strength reaches a specific maximum value, and it will then gradually drop.

Figure 7:
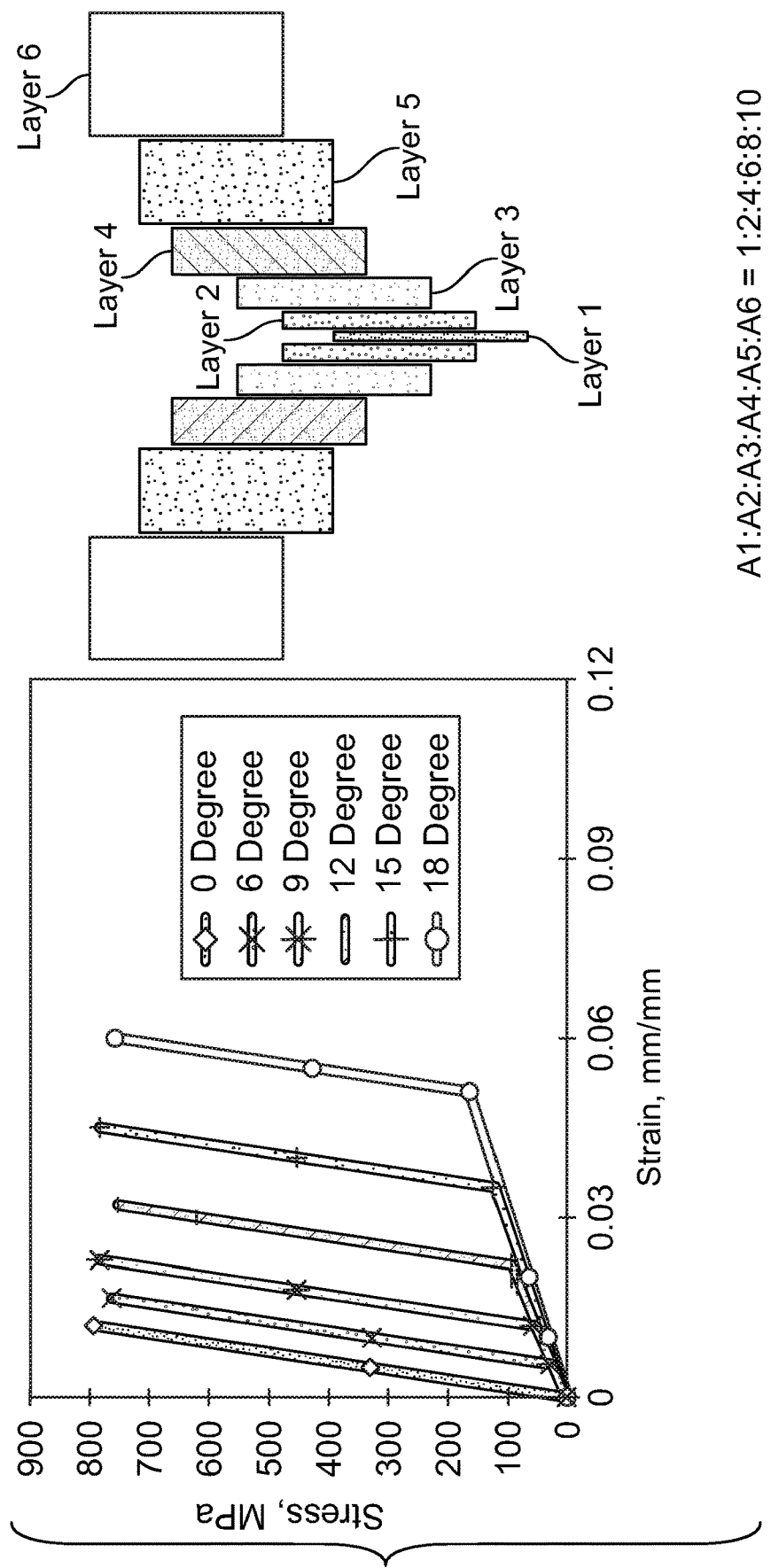
FIG. 7 illustrates bi-linear stress-strain curves for individual layers for an embodiment of the present invention.

A computational model based on composite theory and using the finite element method may be used to design the ductile FRP. Bi-linear stress-strain curves may be assumed for individual layers as shown in FIG. 7.

The bi-linear stress-strain curves may be developed using mechanics of materials. The activation strain $\varepsilon_{inc}$ for individual layers may be computed as a function of inclination angle θ as follow:

$$\varepsilon_{inc} = \frac{\Delta L}{L_o} = \frac{L - L \cdot \cos\theta}{L \cdot \cos\theta} = \frac{1 - \cos\theta}{\cos\theta} = \sec\theta - 1$$

The ultimate/failure strain for individual layers may be computed as $\varepsilon_{ult\_\theta} = \varepsilon_{inc} + \varepsilon_{ult\_0} - \sigma_{inc}/E_0$ we $\varepsilon_{ult\_0}$ and $E_0$ll as the ultimate/failure strain and elastic modulus of unidirectional straight layer respectively.

Figure 8:
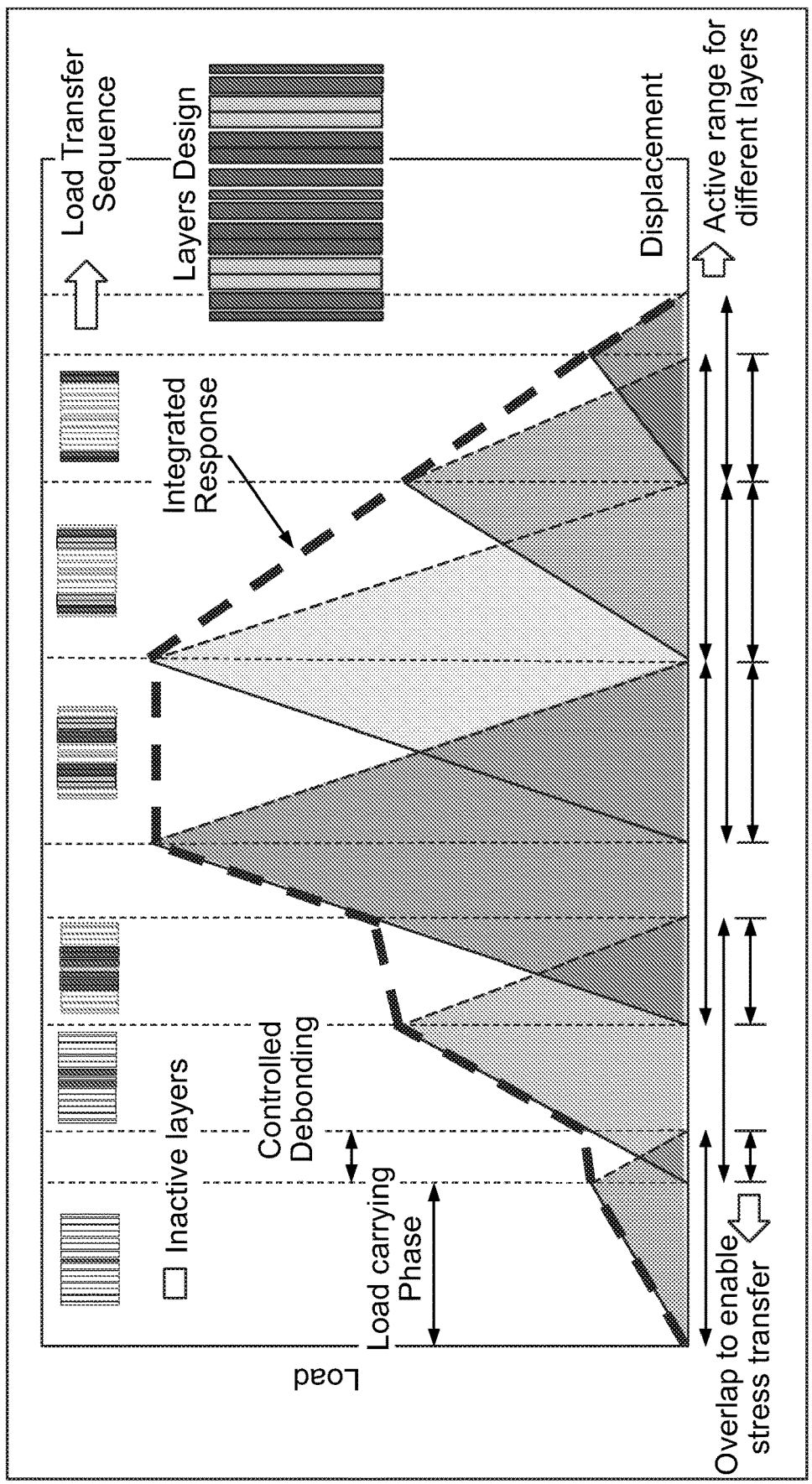
FIG. 8 illustrates controlled gradual and successive load carrying activation, stress-transfer, and debonding of layers for an embodiment of the present invention.

The mechanism of load/stress transfer is depicted in FIG. 8. Fiber recruitments for different layers are designed to allow successively delayed activations and sequential stress transfer between them. Interlaminar matrix properties are engineered to allow successive controlled gradual debonding between different layers as also shown in FIG. 8. Layers stiffness ratios may also be designed to maintain proper load carrying throughout the load history. Sufficient overlap between a debonding previous layer and loading subsequent layer is established to ensure smooth stress transfer throughout the large domain of strain as further shown in FIG. 8.

Figure 9:
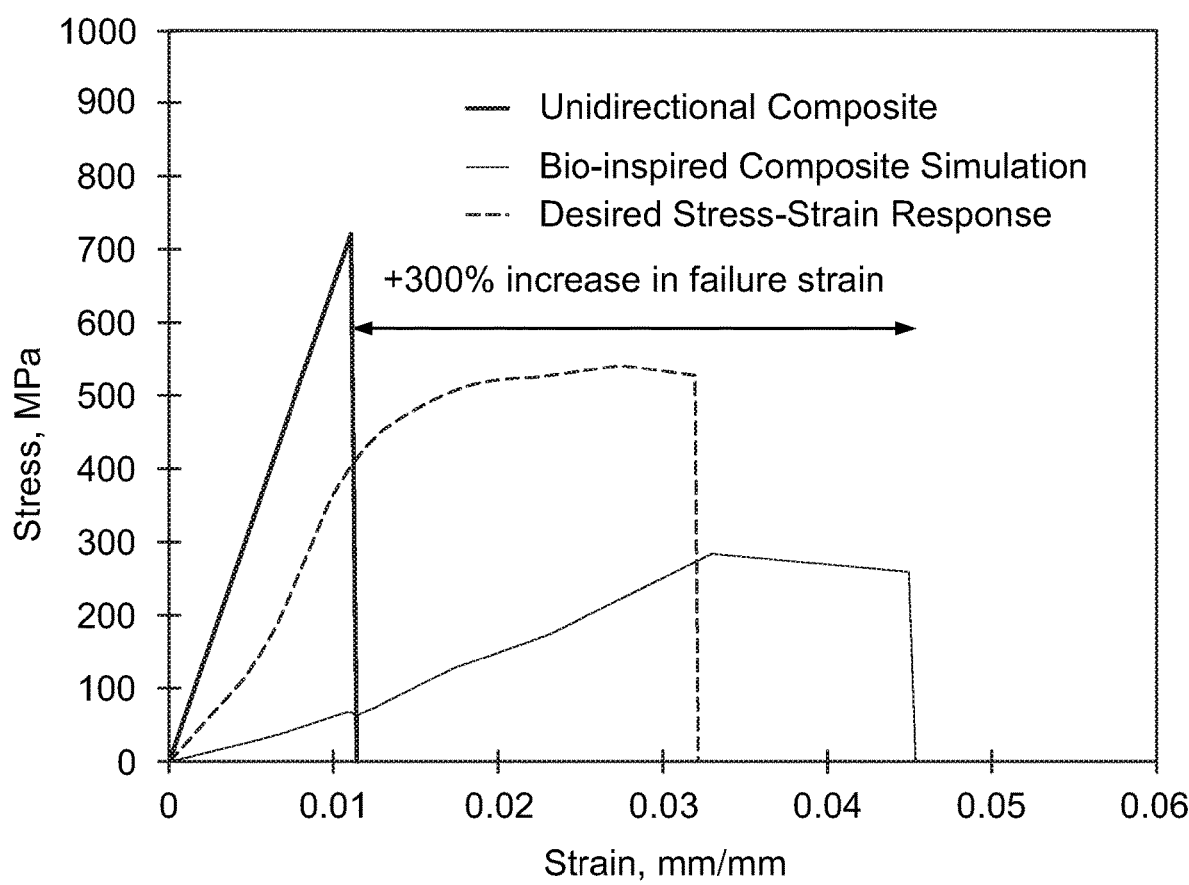
FIG. 9 shows the failure of a ductile FRP composite coupon made according to the present invention compared with the failure of a conventional FRP composite coupon.

Finite Element model was used to compare the stress-strain curve for the ductile FRP composite of the present invention and conventional straight FRP composite coupons. The failure of the ductile FRP composite coupon made in accordance with the present invention is compared with the failure of conventional FRP composite coupon as shown in FIG. 9.

In other embodiments, the present invention provides a composite with an increase in ductility and failure strain which may be controlled by changing areal/stiffness ratios as well as the inclination angles of the fibers. The multiple loading peaks in the stress-strain profile achieve superior ductility and provide sufficient structural warnings prior to complete failure.

In other embodiments, the present invention provides a composite and method of making the same wherein the number of loading peaks and their corresponding strain levels can be designed. This can be achieved by selecting the appropriate number of layers (n), the appropriate inclination angle (q) to achieve specific activation strains ($\varepsilon_{inc}$) to produce a desired non-linear stress-strain profile.

In other embodiments, the present invention provides a fiber reinforced polymer (FRP) composite integrating concepts of gradual fiber recruitment within the layer and shared stiffness between layers to produce any desired nonlinear stress-strain curve. The nonlinearity of the new FRP composite can be controlled by controlling the drop in load capacity by maintaining a sufficient number of active (stretched) layers throughout the loading history. This is achieved by incrementing the activation strains in narrow intervals so that at any point during the loading history, there is a minimum number of active layers to provide adequate load bearing.

The FRP composites of the present invention have superior ductility represented by significantly high failure strain (4-5 times) that of current FRP composites that can be used in many applications that need a high strain at failure such as (seismic and blast applications). A new FRP composite that can be designed using a wide variety of fibers (carbon, glass, aramid, polypropylene, etc.)

A preferred embodiment of the present invention that uses 3-D printed FRP-by-design accomplishes levels of load and ductility never possible using classical FRP manufacturing technology. Therefore, the new composites of the present invention may be used to strengthen civil infrastructure and in aerospace/aircraft industries that need ductile composites. The ductility of the FRP composites of the present invention is achieved through engineering the strain capacity, multiple loading peaks, and a nonlinear stress-strain profile. The embodiments of the present invention are suitable for high strain loading applications such as seismic retrofit, blast and impact resistance.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A fiber reinforced polymer composite comprising:
a central layer and a plurality of successive layers containing a plurality of fibers; and said plurality of successive layers are recruited to assist said central stiff layer to resist a load;
said successive layers include a plurality of fibers, each of said fibers in a layer formed by a plurality of repeating segments, said repeating segments comprised of a plurality of legs connected at apexes to form a zigzag pattern, said apexes having a predetermined apex angle;
said fibers in said central stiff layer are straight;
said successive layers are arranged as layer pairs, said layers pairs form successive layers that are mirror images with respect to said central stiff layer; and
said mirror image layer pairs have a first position wherein each layer pair has a first apex angle and transitions to a second position when a load is applied to said composite and during said transition, said apex angle in each layer pair increases until said fibers straighten.

2. The fiber reinforced polymer composite of claim 1 wherein said fibers are 3D printed using layer-by-layer technique to obtain predetermined fiber paths for composite filaments.

3. The fiber reinforced polymer composite of claim 1 wherein said composite has a predetermined failure strain which results in the recruitment of said successive layers in said composite until all layers of said composite work to resist the load.

4. The fiber reinforced polymer composite of claim 3 wherein said successive layers straighten at different strain levels.

5. The fiber reinforced polymer composite of claim 1, wherein said fibers in each of said successive mirror image layer pair have a different apex angle.

6. The fiber reinforced polymer composite of claim 5 wherein said apex angle in each of said successive mirror image layer pairs decreases from said first layer to said nth layer.

7. The fiber reinforced polymer composite of claim 1 wherein said apex angle in each of said successive mirror image layer pairs decreases from said first layer pair to said nth layer pair.

8. The fiber reinforced polymer composite of claim 3 wherein said mirror image layer pairs range from a first layer pair to an nth layer pair and each respective layer pair has an activation strain $\varepsilon_{inc}$ that is in $\alpha\%$ increments of the failure strain of the composite.

9. The fiber reinforced polymer composite of claim 1 wherein said mirror image layer pairs range from a first layer pair to an nth layer pair and each respective layer pair has a different load peak.

10. The fiber reinforced polymer composite of claim 1 wherein the polymer properties are predetermined throughout the composite using a 3D printing technique.

11. The fiber reinforced polymer composite of claim 1 wherein when said fibers in said successive layer pairs straighten as successive layer pairs are engaged.

12. The fiber reinforced polymer composite of claim 1 wherein said composite has a nonlinear stress-strain profile.

* * * * *